L. D. LOVEKIN.
WATER HEATER.
APPLICATION FILED NOV. 8, 1907.

904,627.

Patented Nov. 24, 1908.

WITNESSES:

INVENTOR
Luther D. Lovekin
BY
Francis ⟨Chambers⟩
his ATTORNEY.

UNITED STATES PATENT OFFICE.

LUTHER D. LOVEKIN, OF PHILADELPHIA, PENNSYLVANIA.

WATER-HEATER.

No. 904,627.  Specification of Letters Patent.  Patented Nov. 24, 1908.

Application filed November 8, 1907. Serial No. 401,231.

*To all whom it may concern:*

Be it known that I, LUTHER D. LOVEKIN, a citizen of the United States of America, residing in the city and county of Philadelphia, in the State of Pennsylvania, have invented a certain new and useful Improvement in Water-Heaters, of which the following is a true and exact description, reference being had to the accompanying drawings, which form a part thereof.

The present invention relates to heaters, and particularly to water heaters, and has for its object to provide a heater which may be compact and simple in construction while at the same time having a relatively large extent of heating surface and which may be easily and cheaply manufactured.

The invention consists, broadly speaking, in a heater comprising an internal cylindrical member formed at its periphery with one or more spiral grooves and a corresponding rib for each groove, and an external hollow member formed with a corresponding spiral groove and rib or grooves and ribs at its inner surface, the internal member being threaded into the external member, the heater having a heating chamber formed by the space between the internal and external members. By suitably forming the grooves and ribs of the two members the space between them, which should in all cases be shallow to give the best results, may be made of uniform thickness or may be of varying thickness and may even be converted into a continuous spiral channel. Any suitable means may be employed for supplying heat to one or the other or both of the internal and external members of the heater. For instance, the internal member may advantageously be made hollow so that a heating fluid may be passed through it. This last mentioned form of heater is particularly adapted for use as a heater in which the heat is derived from the flame of a gas burner.

The various features of novelty which characterize my invention are pointed out in the claims annexed to and forming a part of this specification. For a better understanding of the invention, however, and the advantages possessed by it, reference may be had to the accompanying drawings and descriptive matter in which I have illustrated and described forms in which the invention may be embodied.

Figure 3:
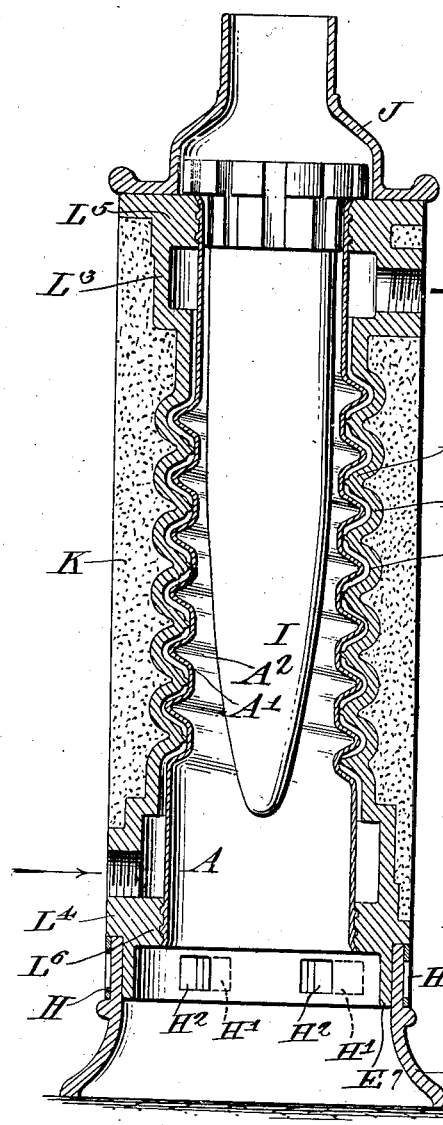
Figure 1:
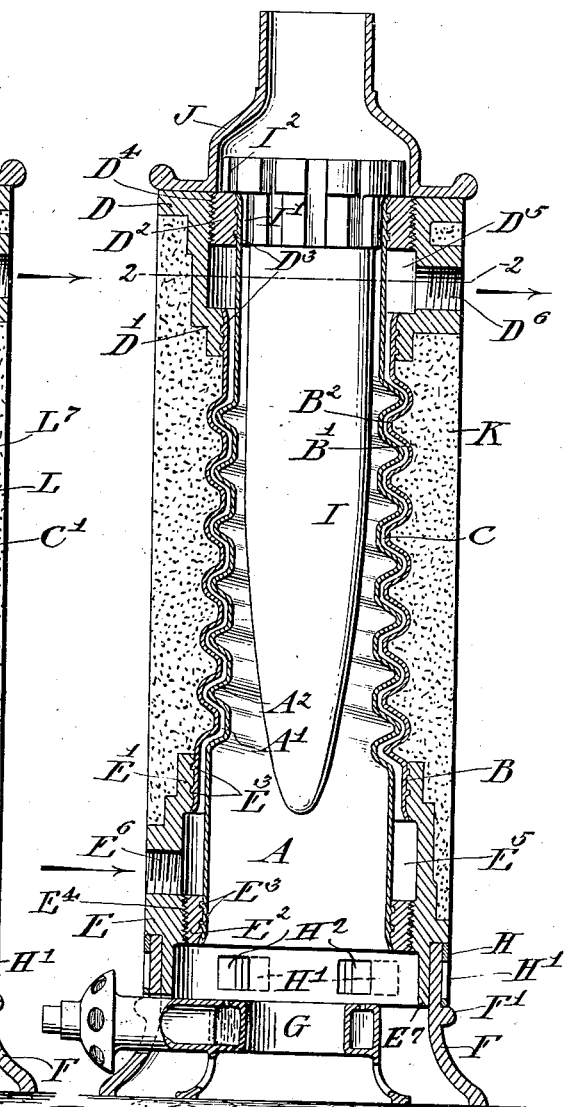
Figure 2:
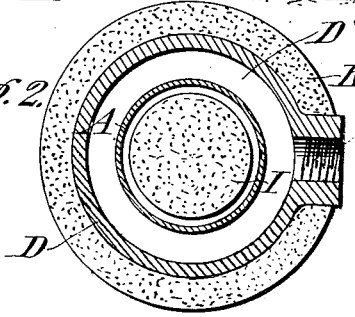

Of the drawings, Figure 1 is a sectional elevation of one form of heater. Fig. 2 is a sectional plan taken on the line 2—2 of Fig. 1, and Fig. 3 is a sectional elevation taken similarly to Fig. 1, but showing a slightly modified construction.

In the drawings, and referring first to the construction of Figs. 1 and 2, A represents the internal member of the heater for heating water or other fluid. The member A, in the form shown, consists of a tubular body having formed in it between its ends the external spiral groove $A'$, and a corresponding external rib $A^2$. Preferably, as in the form shown, the wall of the member A is of uniform thickness so that the external groove $A'$ and rib $A^2$ result in a corresponding internal groove and rib. The external member B of the heater is similarly provided with an internal spiral groove $B'$ and corresponding rib $B^2$. The threads on the two members are of the same pitch. The member B, like the member A, may well consist as shown, of a spirally corrugated thin tube of suitable wrought metal. In the form shown in Fig. 1, the groove $A'$ and rib $A^2$ are so formed relatively to the groove $B'$ and rib $B^2$ that the space C between them is of a thickness which is uniform and materially less than the distance which the ribs $A^2$ and $B^2$ extend beyond the bottoms of the corresponding grooves $A'$ and $B'$.

The ends of the tubes A and B are connected to top and bottom end members D and E. As shown, the end member D is provided with an internally projecting flange $D'$ to which the upper end of the member B is connected in any suitable manner, as preferably by internally expanding the latter. The upper end of the member D is internally threaded to receive a threaded bushing into which the upper end of the member A is secured, as by internally expanding the latter, and the expansion may well be carried on to such an extent as to expand the member $D^2$ in the member D and thus make the threaded joint $D^4$ between the members D and $D^2$ perfectly tight. To improve the joint between the member A and the bushing $D^2$ the latter may be formed with grooves $D^3$ into which the material of the member A is expanded as shown. The heating space C leads into an annular space or chamber $D^5$ formed in the member D between the flange $D'$ and the nut $D^2$. A threaded outlet port $D^6$ is formed on one side of the member D. The member E is connected to the tubes A and B in the same manner as is the member D and the parts E', E², E³, E⁴, E⁵ and E⁶ corresponding to parts D', D², D³, D⁴, D⁵, and D⁶, respectively, except that the part E⁶ is in this case the inlet port. The member E is supported on a base member F, and a gas burner G, which may be of any suitable construction, is located in the base member F. By preference, a collar H is provided on a rib F' of the member F which may be rotated to bring the ports H' formed in it into and out of register with the ports H² formed through the member F and the overlapping flange E⁷ of the member E, to regulate the draft into the interior of the heater. To assist in controlling the time of flow of the heating gas through the member A, a refractory retarding finger I may be provided. In the form shown, this finger I has its lower end conical, and has at its upper end ribs I' which engage the inner surface of the upper end of the member A to position the retarder, and ears I² which engage the upper end of the member A and the ring D² and thus form a means for supporting the refractory member I. A chimney or waste gas escape pipe J may be mounted on the upper end of the member D, and preferably the heater is surrounded by a jacket K of suitable heat insulating material.

The construction just described possesses the advantage of providing in a compact heater a heating space in which the water to be heated is in a comparatively thin body and is exposed to a heating surface which is relatively large; while at the same time, the flow of the heating gases through the heater is retarded by the retarder I and the internal grooves and ribs of the tube A. Moreover, the retarder I serves to some extent as a heat storing device effective in reducing the amount of heat carried up through the chimney J by the hot gases. The tubes A and B may be readily and cheaply formed, and may be assembled without difficulty by threading them together. The other parts are simple and may be cheaply constructed, and the entire heater may be constructed and assembled in an accurate and reliable manner at a slight expense.

The construction shown in Fig. 3 differs from that of Fig. 2 in the fact that the member L corresponding to the member B of Fig. 1 is of cast metal and has formed integrally with it the end portions L³ and L⁴, which correspond generally to the members D and E, with the exception, of course, that there is no joint between the tube L and the end members. In this construction also, the ends of the tube A are secured to flanges L⁵ and L⁶ formed integrally on the end members L³ and L⁴, and taking the place of the nuts D² and D² in the construction shown in Fig. 1. In this construction also, the water space between the members A and L is divided into a spiral channel C' by the fact that the spiral rib L⁷ carried by the member L is extended to engage with the bottom of the groove A' in the member A.

The corrugations formed in the walls of the chamber containing the water or other fluid to be heated permit the walls to contract and expand as their temperature varies without liability of injuring the parts or impairing joints.

While my invention is well adapted for a gas heated water heater as shown, which heater may well be of the "instantaneous" type, it will be understood by those skilled in the art that my novel container formed of an externally threaded internal member screwed into an internally threaded external member can be employed in many different relations, and I do not wish the claims made hereinafter to be limited to the particular construction disclosed more than is necessary by the state of the art.

Having now described my invention, what I claim as new and desire to secure by Letters Patent is:

1. A heater comprising an internal member having a spiral rib and a corresponding spiral groove on its outer surface, and an external member surrounding the internal member and formed with a spiral rib and corresponding groove on its internal surface, with the rib of each member nesting in the groove of the other.

2. A heater comprising an externally threaded internal member and an internally threaded external member into which the internal member is screwed, the threads on the two members being so formed that a heating space is provided between said members.

3. A heater comprising an externally threaded internal member and an internally threaded external member into which the internal member is screwed, the threads on the two members being so formed that a heating space is provided between said members, and means connecting said members to close the ends of said space.

4. A heater comprising an externally threaded internal member and an internally threaded external member into which the internal member is screwed, the threads on the two members being so formed that a heating space is provided between said members, means connecting said members to close the ends of said space, and inlet and outlet conduits communicating with said space at its opposite ends.

5. A heater comprising an externally threaded internal member and an internally threaded external member into which the internal member is screwed, the threads on the two members being so formed that a heating space is provided between said members, and means connecting said members to close the ends of said space, said internal member being hollow, and means for heating the interior of said hollow internal member.

6. A heater comprising a vertical hollow externally threaded internal member and an internally threaded external member into which the internal member is screwed, the threads on the two members being so formed that a heating space is provided between said members, and means connecting said members to close the ends of said space, a fuel burner located at the lower end of said hollow member, and a retarder centrally disposed in and partially filling the upper end of said hollow internal member.

7. A fluid heater comprising a spirally corrugated hollow internal member and an internally threaded external member into which said internal member is threaded, the members being spaced apart to form between them a passage for the fluid to be heated, and means for causing a heating fluid to flow through said hollow member.

LUTHER D. LOVEKIN.

Witnesses:
 ARNOLD KATZ,
 S. STEWART.